July 15, 1941. K. N. FRANCISCO 2,248,978
DELIGNIFICATION OF BLACK LIQUOR SOAP
Filed Feb. 14, 1938
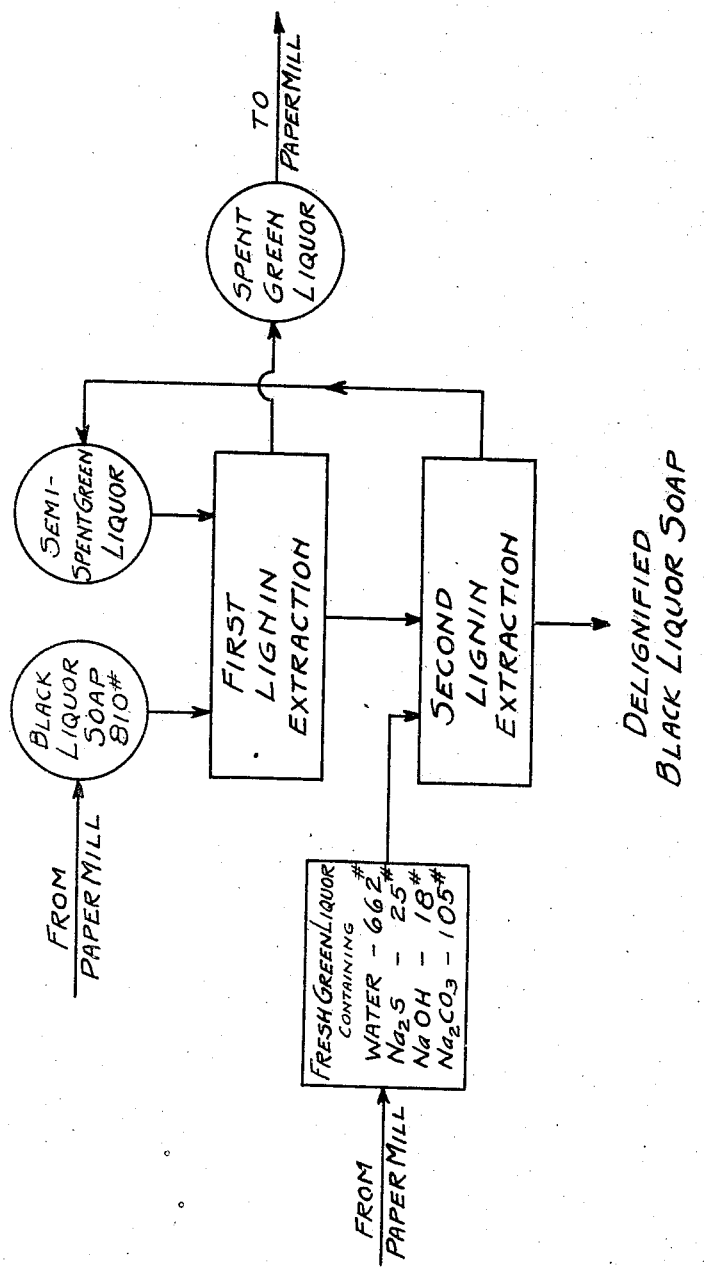
INVENTOR.
KENNETH N. FRANCISCO
BY *Wm. P. Spielman*
ATTORNEY Patented July 15, 1941

2,248,978

UNITED STATES PATENT OFFICE 2,248,978

DELIGNIFICATION OF BLACK LIQUOR SOAP

Kenneth N. Francisco, North Caldwell, N. J., assignor to American Cyanamid & Chemical Corporation, New York, N. Y., a corporation of Delaware Application February 14, 1938, Serial No. 190,529

5 Claims. (Cl. 260—97.5)

This invention relates to the delignification of black liquor soap, which is a mixture of soaps of resinous and fatty acids obtainable as a by-product when coniferous woods are digested by the kraft or sulfate process.

Heretofore it has been proposed to delignify black liquor soap by acidifying it to liberate the free fatty acids and filtering the resulting mixture while hot, whereupon the free fatty acids and inorganic salts are filtered off while the lignin remains on the filter. It is an object of the present invention to delignify black liquor soap with a non-acid medium, whereby the soaps are obtained as such and not in the form of their free fatty acids. A further object of the invention is to extract the lignin, or rather the sodium lignate, from black liquor soap using a neutral or alkaline aqueous solution of an inorganic salt. A still further object of the invention is to employ as a preferred extracting medium an alkaline salt solution containing salts obtained from the smelting furnace forming a part of the kraft process of fiber liberation, so that the spent liquor may be returned after extraction to the settling tanks containing the partially evaporated black liquor. Still further objects will be apparent from the following description and will be pointed out in the claims appended hereto.

The invention will be more particularly described in conjunction with the accompanying drawing, the single figure of which is a flow sheet illustrating a preferred modification thereof. It is understood, however, that the invention in its broader aspects is not limited to this flow sheet, which is for illustrative purposes only.

In the kraft or sulfate process of fiber liberation, as applied to the coniferous woods found in the southern states, the wood chips are heated under pressure in closed digesters with an alkaline cooking liquor known as "white liquor." A typical white liquor contains

| | Grams |
|---|---|
| Sodium hydroxide | 100 |
| Sodium carbonate | 40 |
| Sodium sulfide | 37 | per liter, although of course its composition may vary with different woods and different cooking schedules. This liquor extracts the lignin, terpenes and other non-cellulosic constituents of the wood and is discharged from the digester at the end of the cook as a dark liquid known as "black liquor." When the black liquor is concentrated and permitted to stand, a viscous material separates out which is known as "black liquor soap," and this is the material dealt with by the present invention.

In ordinary sulfate mill practice, the black liquor is concentrated in multiple-effect evaporators, the crude black liquor soap is skimmed off and the skimmed black liquor is then burned or smelted in a furnace with the addition of sodium sulfate and sulfur. The organic matter is burned out in the furnace and the inorganic constituents are recovered as a "melt" which is dissolved in water to form a make-up liquor known as "green liquor." The composition of a typical green liquor is indicated on the accompanying drawing as containing

| | Per cent |
|---|---|
| Sodium sulfide | 3.1 |
| Sodium hydroxide | 2.2 |
| Sodium carbonate | 13.0 |
| Water | 81.7 | although of course this composition may vary from mill to mill and even from batch to batch. This green liquor is used as a base for making up further supplies of "white liquor" for reuse in the digesters by causticizing it with lime.

The black liquor soap which is separated from the black liquor is a crude, viscous mixture of the sodium soaps of abietic and higher fatty acids together with a number of impurities, the most troublesome of which is sodium lignate. This impurity liberates a gummy mass of free lignin whenever the soap is acidified, and even in the form of its sodium salt it is sticky and difficult to filter or manipulate. It varies in amount in the black liquor soap from 0.5% to as much as 10% or higher, and is inert and resistant to treatment by chemical means.

I have found that the lignin can be extracted from black liquor soap as sodium lignate without acidification by simple extraction with a non-acid solution of almost any inorganic salt. By the term "non-acid salt" I mean a salt which, when used as an extracting agent, will not make the black liquor soap so acid as to liberate free lignin from the sodium lignate therein. Preferably a solution is used which is also capable of inhibiting the solution in water of the sodium salts of abietic and higher fatty acids, as this avoids the formation of troublesome emulsions during the extraction.

While a single extraction, if sufficiently long continued, will remove most of the lignin from black liquor soap, I have also found that a series of shorter extractions will extract practically all the lignin in an even shorter time. These extractions are preferably carried out on the countercurrent principle; that is to say, the crude mixture of soaps is subjected to a first extraction with semi-spent salt solution from a previous extraction and is then given a last extraction with a fresh salt solution. One or more intermediate extractions with partially spent salt solution may also be used if desired.

Another important feature of my invention resides in the use, as a lignin extracting medium, of a salt solution containing the inorganic constituents normally found in the regenerative cycle of a kraft paper mill; i. e. a solution containing one or more of the constituents of "green liquor" or "white liquor." Such solutions can be withdrawn from the kraft mill cycle and, when the extraction is completed, the spent extracting liquor can be returned to the mill cycle and its salt and soap content recovered. For example, when green liquor is used as the extracting medium the spent green liquor can be passed to the settling tanks containing the black liquor, from which a part of the crude black liquor soap was originally obtained. By this means any black liquor soap that may have been lost in the extraction is recovered with the crude soap normally skimmed from the top of the tank, while the salt content of the extracting solution is concentrated and recovered in the smelting furnace. Similarly, when white liquor is the extracting medium the spent solution can be introduced into the digesters and its salt and soap content will be recovered in the next regenerative mill cycle.

In its preferred modification my invention employs the green liquor from a sulfate mill as the extracting medium and passes the resulting spent green liquor to the black liquor storage tanks. By so operating, any black liquor soap that may be carried away in the extraction is recovered in the "weak" black liquor soap skimmed from the storage tanks or in the "strong" black liquor soap obtained by skimming the black liquor after it has been partially concentrated.

In the accompanying drawing, I have illustrated a two-stage countercurrent extraction using green liquor as the extracting medium. Referring to this drawing it will be seen that the fresh black liquor soap, which in this instance may contain 0.5–2% of lignin as sodium lignate, is first agitated with a semi-spent solution of green liquor which before use had the analysis indicated. The agitation is carried out at ordinary temperatures, or in case a very strong black liquor soap is being treated it may be heated by the injection of steam or by closed steam coils. The agitation is continued for about one hour, after which the spent green liquor is drawn off and returned to the black liquor storage tanks as above described. The black liquor soap is then agitated for one hour longer with a second batch of fresh green liquor which, after settling for 30 minutes, is drawn off for reuse in treating another batch of crude black liquor soap.

It is apparent from a consideration of the flow diagram that three, four or any number of extractions may be given to a batch of black liquor soap according to the invention, the number and extent depending on the amount of lignin to be removed. It is also apparent that the process may readily be converted into a continuous one, if desired, by simply providing a number of agitated vats in which the black liquor soap moves in countercurrent with fresh green liquor or white liquor or any other suitable non-acid inorganic salt solution.

A typical black liquor soap that I have purified by the above process has the following analysis:

| | Per cent |
|---|---|
| Water | 32.3 |
| Na | 4.8 |
| Oxy acids, lactones, saccharides | 3.5 |
| Water insolubles | 0.2 |
| Lignin | 1.4 |
| Resin acids | 27.0 |
| Sterols | 1.3 |
| Fatty acids | 26.8 |
| Inorganic | 2.7 |
| | 100.0 |

After a two-stage extraction with green liquor as illustrated on the drawing, the lignin content was reduced to 0.14% lignin, while 1.21% of black liquor soap was lost in the extracting liquor. The soap so lost is, of course, recovered in the following batch. For each extraction, a volume of green liquor roughly equal to the volume of the black liquor soap undergoing treatment was used, as is also indicated on the accompanying drawing.

While the invention has been illustrated by detailed description of a preferred modification thereof, and while specific quantities and proportions have been given, it is understood that the invention in its broader aspects is not limited thereto, but that modifications and substitutions of equivalents may be resorted to within the scope of the appended claims.

What I claim is:

1. A method of removing the lignin from black liquor soap which comprises extracting said soap with a relatively dilute aqueous solution containing sodium hydroxide, sodium carbonate and sodium sulfide.

2. A method of removing the lignin from black liquor soap which comprises extracting said soap with an aqueous solution containing "green liquor" as prepared in a kraft paper mill.

3. A method of removing the lignin from black liquor soap which comprises extracting said soap with an aqueous solution containing "white liquor" as prepared in a kraft paper mill.

4. A method of obtaining delignified black liquor soap from the black liquor of a kraft paper mill which comprises skimming soap from said black liquor, concentrating and smelting the skimmed black liquor, dissolving the melt in water, extracting the black liquor soap with a portion of the resulting alkaline salt solution for the removal of lignin therefrom, and mixing the solution after the extraction with said black liquor before the final skimming thereof to recover any soap lost in the extraction.

5. A method of delignifying the crude mixture of soaps obtained from the black liquor discharged from the digesters of a kraft paper mill which comprises extracting the mixture with "white liquor" from the regenerative cycle of said mill and introducing the spent solution after the extraction into said digesters.

KENNETH N. FRANCISCO.